US006410156B1

(12) United States Patent
Akkapeddi et al.

(10) Patent No.: US 6,410,156 B1
(45) Date of Patent: Jun. 25, 2002

(54) OXYGEN SCAVENGING POLYAMIDE COMPOSITIONS SUITABLE FOR PET BOTTLE APPLICATIONS

(75) Inventors: Murali K. Akkapeddi, Morristown; Edward P. Socci, Stewartsville; Timothy J. Kraft, Pompton Plains; Darnell C. Worley, II, Phillipsburg; Jeffrey D. Pratt, Budd Lake, all of NJ (US); Clark V. Brown, White Plains, NY (US)

(73) Assignee: Honeywell International Inc., Morris Township, NJ (US)

( * ) Notice: Subject to any disclaimer, the term of this patent is extended or adjusted under 35 U.S.C. 154(b) by 18 days.

(21) Appl. No.: 09/800,218

(22) Filed: Mar. 6, 2001

(51) Int. Cl.[7] .......................... B32B 27/08; B29C 45/00
(52) U.S. Cl. .................... 428/476.1; 264/510; 264/512; 264/513; 264/514; 264/515; 264/173.19; 264/216; 264/237; 264/250; 264/255; 264/328.8; 264/531.19; 264/331.21; 428/475.2; 428/475.5
(58) Field of Search ................ 525/66, 432; 428/476.1, 428/475.5, 475.2, 476; 264/510, 512, 513, 514, 515, 173.19, 216, 237, 250, 255, 328.8, 331.19, 331.21

(56) References Cited

U.S. PATENT DOCUMENTS

| | | | |
|---|---|---|---|
| 4,536,409 A | 8/1985 | Farrell et al. ................. 426/398 |
| 4,702,966 A | 10/1987 | Farrell et al. ................. 428/500 |
| 4,800,129 A | * 1/1989 | Deak ........................ 428/474.4 |
| 4,826,955 A | 5/1989 | Akkapeddi et al. ........... 528/324 |
| 5,021,515 A | 6/1991 | Cochran et al. ............. 525/371 |
| 5,055,355 A | 10/1991 | Deantonis et al. ......... 428/476.3 |
| 5,075,362 A | 12/1991 | Hofeldt et al. ................ 524/72 |
| 5,126,401 A | * 6/1992 | Chou .......................... 525/58 |
| 5,202,052 A | 4/1993 | Zenner et al. ........... 252/188.28 |
| 5,211,875 A | 5/1993 | Speer et al. ............. 252/188.28 |
| 5,364,555 A | 11/1994 | Zenner et al. .......... 252/188.28 |
| 5,529,833 A | 6/1996 | Speer et al. .................. 428/215 |
| 5,541,267 A | 7/1996 | Akkapeddi et al. .......... 525/432 |
| 5,547,765 A | 8/1996 | Degrassi et al. .......... 428/474.7 |
| 5,639,815 A | 6/1997 | Cochran et al. ............. 524/413 |
| 5,747,560 A | 5/1998 | Christiani et al. ........... 523/209 |

FOREIGN PATENT DOCUMENTS

JP 51-109998 9/1976

OTHER PUBLICATIONS

Borggreve, R.J.M., Et Al "Impact Modification of poly(caprolactam) by copolymerization with a low molecular weight polybutadiene" Polymer, vol. 29, Aug. 1988, pp. 1441–1446.

* cited by examiner

Primary Examiner—Ana Woodward
(74) Attorney, Agent, or Firm—Roger H. Criss

(57) ABSTRACT

Oxygen scavenging barrier polyamide compositions exhibiting high oxygen scavenging capability as well as good coinjection stretch blow moldability characteristics suitable for making multilayer PET bottles with good clarity and delamination resistance are claimed in this invention. The polyamide compositions of this invention comprise a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst. The multilayer PET bottles, made with the polyamide compositions of this invention as the barrier layer, are suitable for extended shelf-life packaging of oxygen-sensitive food and beverage products such as beer and juices.

18 Claims, No Drawings

OXYGEN SCAVENGING POLYAMIDE COMPOSITIONS SUITABLE FOR PET BOTTLE APPLICATIONS

BACKGROUND OF THE INVENTION

1. Field of the Invention

The present invention relates to polyamide compositions. More particularly, the invention relates to oxygen barrier polyamide compositions exhibiting high oxygen scavenging capability as well as good coinjection stretch blow moldability with polyethylene terephthalate (PET), to enable the fabrication of clear, high barrier multilayer PET bottles for long shelf-life packaging applications. Such containers are useful for packaging a variety of oxygen-sensitive food and beverage products such as beer, juices and condiments as well as certain pharmaceutical and health care products.

2. Description of the Related Art

It is well known in the art to provide polyamide based packaging articles such as films, bottles, containers, and the like, which are useful for food packaging. Many such articles are made of multiple layers of different plastics in order to achieve the desired barrier properties. For example, U.S. Pat. Nos. 5,055,355 and 5,547,765 teach laminates of polyamides and ethylene vinyl alcohol copolymers which have good oxygen barrier properties.

In order to enhance freshness preservation, it is a standard practice to package food and beverage products within a packaging structure composed of laminated sheets of two or more plastics. Such packaging structures generally include a barrier plastic layer which has a low permeability to oxygen. The packaging structure can be thin, in which case it is wrapped around the item being packaged, or it can be thick enough to form a shaped container body such as a bottle.

It is known in the art to include an oxygen scavenger in the packaging structure. An oxygen scavenger reacts with oxygen that is trapped in the package or that permeates from outside of the package. This is described, for example, in U.S. Pat. Nos. 4,536,409 and 4,702,966. U.S. Pat. No. 4,536,409 describes cylindrical containers formed from such packaging plastics.

Various types of oxygen scavengers have been proposed for this purpose. U.S. Pat. No. 4,536,409 recommends potassium sulfite as an oxygen scavenger. U.S. Pat. No. 5,211,875 discloses the use of unsaturated hydrocarbons as oxygen scavengers in packaging films. It is known in the art that ascorbic acid derivatives as well as sulfites, bisulfites, phenolics, and the like can be oxidized by molecular oxygen, and can thus serve as an oxygen scavenging material. U.S. Pat. No. 5,075,362 discloses the use of ascorbate compounds in containers as oxygen scavengers. U.S. Pat. Nos. 5,202,052 and 5,364,555 describe polymeric material carriers containing oxygen scavenging material. These polymeric carriers for the oxygen scavenging material include polyolefins, polyvinylchloride (PVC), polyurethanes, ethylene vinyl acetate (EVA) and polyethylene terephthalate (PET).

U.S. Pat. Nos. 5,021,515, 5,049,624 and 5,639,815 disclose packaging materials and processes therefor which utilize a polymer composition which is capable of scavenging oxygen. Such compositions include an oxidizable organic polymer component, preferably a polyamide, such as nylon MXD6, and a metal oxidation promoter, such as a cobalt compound. These compositions can be used with PET, for example.

U.S. Pat. No. 5,529,833 describes the use of a composition comprising an ethylenically unsaturated hydrocarbon oxygen scavenger which is incorporated into a film layer, and used for making packaging for oxygen sensitive products. The oxygen scavenger is catalyzed by a transition metal catalyst and a chloride, acetate, stearate, palmitate, 2-ethylhexanoate, neodecanoate or naphthenate counterion. Preferred metal salts are selected from cobalt (II) 2-ethylhexanoate and cobalt (II) neodecanoate. Because water deactivates the oxygen scavenger composition, the composition can only be used for packaging for dry materials.

Despite these advances in the art, there still remains a need for a barrier polymer material which can provide high oxygen scavenging capability in order to reduce the oxygen permeation into a container. There also is a particular need for oxygen scavenging polymeric materials which meet the processing requirements for coinjection molding and reheat stretch blow molding with PET to permit the fabrication of transparent multilayer barrier PET bottles. For the latter requirement, the material must be (a) melt processable at high temperatures of up to 280° C. without degradation, (b) slow to crystallize, like PET, during injection molding such that the molded preform is sufficiently amorphous to permit subsequent reheat, stretch-blow molding into an oriented bottle and (c) low in crystallinity to give a barrier layer with high clarity and delamination-resistance (good adhesion) to PET layer.

SUMMARY OF THE INVENTION

The invention provides a polyamide composition which comprises:
   a) a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70;
   b) at least one polyamide-compatible, oxidizable polydiene; and
   c) at least one oxidation promoting metal salt catalyst.

The invention further provides an oxygen barrier film comprising a layer of a polyamide composition which comprises:
   a) a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70;
   b) at least one polyamide-compatible, oxidizable polydiene; and
   c) at least one oxidation promoting metal salt catalyst.

The invention still further provides a multilayer article which comprises:
   a) a polyamide composition layer comprising a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst; and b) a thermoplastic polymer layer on one or both sides of the polyamide composition layer.

The invention still further provides a shaped article which comprises a polyamide composition comprising:

a) a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70;

b) at least one polyamide-compatible, oxidizable polydiene; and c) at least one oxidation promoting metal salt catalyst.

The invention still further provides a process for producing a polyamide composition which comprises:

a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70;

b) blending the molten polyamide blend with at least one polyamide-compatible, oxidizable polydiene and at least one oxidation promoting metal salt catalyst to thereby form a mixture; and c) cooling the mixture.

The invention still further provides a process for producing an oxygen barrier film which comprises:

a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70;

b) blending the molten polyamide blend with at least one polyamide-compatible, oxidizable polydiene and at least one oxidation promoting metal salt catalyst to thereby form a mixture;

c) extruding, casting or blowing the mixture into a film; and d) cooling the film.

The invention still further provides a process for producing an oxygen barrier polyamide film which comprises:

a) melting a composition which comprises a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst;

b) extruding, casting or blowing the composition into a film; and c) cooling the film.

The invention still further provides a process for producing a multilayer article which comprises:

a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;

b) separately melting a thermoplastic polymer composition;

c) coextruding, casting, blowing, thermoforming, blow molding or coinjecting the mixture and thermoplastic polymer composition into a multilayer article; and d) cooling the article.

The invention still further provides a process for producing a multilayer article which comprises:

a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;

b) separately melting a thermoplastic polymer composition;

c) coinjecting molding the mixture and thermoplastic polymer composition into a multilayer preform;

d) reheating the perform; and e) blow molding the perform into a multilayer article.

The invention still further provides a multilayer article formed by a process comprising:

a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;

b) separately melting a thermoplastic polymer composition;

c) coinjecting molding the mixture and thermoplastic polymer composition into a multilayer preform;

d) reheating the perform; and e) blow molding the perform into a multilayer article.

This invention provides a barrier polymer material which can provide high oxygen scavenging capability in order to reduce the oxygen permeation into the container. This invention further provides oxygen scavenging polymeric materials which meet the processability requirements for coinjection moldability and reheat stretch blow moldability with PET to permit the fabrication of transparent multilayer barrier PET bottles. The polyamide compositions of this invention are suitable for coinjection stretch-blow molding with PET, to thereby form a multilayered film which serves as a barrier layer suitable for bottles for extended shelf-life packaging of oxygen-sensitive food and beverage products.

DETAILED DESCRIPTION OF THE PREFERRED EMBODIMENT

According to the invention an improved oxygen-scavenging barrier polyamide composition suitable for coinjection stretch-blow molding with PET is prepared by combining a slow crystallizing polyamide blend; at least one polyamide-compatible, oxidizable polydiene; and at least one oxidation promoting metal salt catalyst.

The polyamide blend component comprises (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70. The polyamides used in the polyamide blend of the invention may be obtained from commercial sources or may be prepared using conventional techniques. Preferably, the amorphous, non-crystallizable semiaromatic polyamide of the invention comprises a homopolymer or a random copolymer having a molecular weight of from about 10,000 to about 100,000, a Tg of from about 70° to 200° C. and good oxygen barrier property such as an oxygen permeability of <1 cc.mil/100 in$^2$/atm day in air. Semiaromatic polyamides comprising aromatic monomer units and linear aliphatic monomer units, without pendant groups or substituents, are particularly preferred in this invention since they are known to exhibit intrinsically good gas barrier properties due to their low free volume or high chain packing density. Examples of such amorphous, semiaromatic polyamides nonexclusively include PA-6I, PA-6I/6T, PA-MXDI, PA-6/MXDI, PA-6/6I and the like. PA-6I/6T is commercially available from EMS corporation of Zurich, Switzerland, under the name Grivory G21, or from DuPont of Wilmington, Del., USA, under the name Selar PA3426. In contrast, semi-aromatic polyamides composed of monomer units with bulky pendant groups or bulky cycloaliphatic rings are poor gas barrier materials and hence are not suitable and hence not preferred for making the high barrier oxygen-scavenging compositions of this invention. An example of such a polyamide is poly(2,4,4-trimethyl hexamethylene terephthalamide), sold by Huls of Somerset, New Jersey, USA under the name Trogamid.

General procedures useful for the preparation of amorphous, semiaromatic polyamides are well known to the art. Such are the reaction products of diacids with diamines. Useful diacids for making such polyamides include dicarboxylic acids of the general formula:

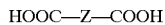

HOOC—Z—COOH wherein Z is representative of a divalent short chain (<10C) aliphatic diacid such as adipic acid, azelaic acid, sebacic acid or more preferably an unsubstituted aromatic dicarboxylic acid such as isophthalic acid, terephthalic acid, 2,6-naphthalene dicarboxylic acid, and the like. Suitable diamines for making polyamides include aliphatic diamines having the formula

H$_2$N(CH$_2$)$_n$NH$_2$ wherein n has an integer value of 1–10, and includes such compounds as trimethylenediamine, tetramethylenediamine, pentamethylenediamine, hexamethylenediamine, octamethylenediamine, decamethylenediamine, and the like. Aromatic diamines such as m- or p-xylylene diamine are particularly suited. Other aromatic diamines such as 4,4'-diaminodiphenyl ether, 4,4'-diaminodiphenyl sulphone, 4,4'-diaminodiphenylmethane are useful only for interfacial polycondensation, a somewhat expensive and less common method.

Suitable amorphous semi-aromatic polyamides nonexclusively include poly(hexamethylene isophthalamide-co-terephthalamide) (PA-6,I/6,T), poly(hexamethylene isophthalamide) (PA-6,I), poly(tetramethylenediamine-co-isophthalic acid) (PA-4,I), and the like, and other polyamides abbreviated as PA-MXDI, PA-6/MXDT/I, PA-6,6/6I, and the like. Blends of two or more aliphatic/aromatic polyamides and/or aliphatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Suitable semi-crystalline aliphatic polyamides nonexclusively include homopolymers such as poly(6-aminohexanoic acid) (PA-6), also known as poly(caprolactam), poly(hexamethylene adipamide) (PA-6,6), poly(7-aminoheptanoic acid) (PA-7), poly(10-aminodecanoic acid) (PA-10), poly(11-aminoundecanoic acid) (PA-11), poly(12-aminododecanoic acid) (PA-12), poly(hexamethylene sebacamide) (PA 6,10), poly(hexamethylene azelamide) (PA-6,9), poly(tetramethylene adipamide (PA- 4,6), caprolactam/hexamethylene adipamide copolymer (PA-6,6/6), hexamethylene adipamide/caprolactam copolymer (PA-6/6,6) and the like, as well as copolymers and mixtures thereof. Of these, preferred aliphatic polyamides include polycaprolactam, commonly referred to as nylon 6, and polyhexamethylene adipamide, commonly referred to as nylon 6,6, and mixtures thereof. Of these, polycaprolactam is most preferred.

The polyamide components of the polyamide blend used in this invention are non-oxidizable. Hence, an oxidizable polydiene is used in this invention to serve as an oxygen scavenger under the intended, ambient conditions of use of the product in packaging applications.

The amount of the polyamide blend component present in the overall composition preferably ranges from about 80% to about 99.9% by weight of the overall composition, preferably from about 90% to about 99% by weight of the overall composition, and more preferably from about 95% to about 98% by weight of the overall composition. The polyamide blend itself comprises of a blend of (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70. A more preferred ratio of (i):(ii) ranges from about 80:20 to about 35:65, most preferably from about 70:30 to about 40:60. The most preferred ratio is about 50:50.

The polyamide blend of this invention preferably exhibits a slow crystallization behavior similar to that of PET, characterized by no or slow onset of crystallization, as determined by the differential scanning calorimetry (DSC) crystallization exotherm (Tcc) peak that occurs upon cooling the melt from 280° C. at a programmed cooling rate of 20° C./min. For PET, Tcc is about 190° C., which is about 70° below its crystalline melting point (T$_m$) of 260° C. Thus, the polyamide composition of this invention preferably exhibits either no Tcc (no tendency for crystallization) or a low Tcc or crystallization temperature of about 150° C. or less, upon cooling from the melt at a cooling rate of 20° C./min in a DSC apparatus. At faster cooling rates (80° C./min) the polyamides of this invention exhibit no or very low Tcc (see Table 1). Example 3 exhibits no detectable Tcc at a cooling rate of 80° C./min. Example 4 exhibits a low Tcc (121° C.). PET exhibits no detectable Tcc at a cooling rate of 80° C./min.

The polyamide composition of this invention preferably exhibits a low degree of crystallinity after injection molding, preferably ranging from about 0 to about 30%, more preferably from about 5 to about 25% and most preferably from about 10 to about 20% as determined by differential scanning calorimetry or wide angle X-ray diffraction (WAXD) techniques.

As mentioned above, the polyamide components of the polyamide blend used in this invention are non-oxidizable. Hence, an oxidizable polydiene is used in this invention to serve as an oxygen scavenger under the intended, ambient conditions of use of the product in packaging applications. The polyamide composition of the invention also contains at least one functional, polyamide-compatible, oxidizable polydiene which serves as an oxygen scavenger, which is preferably dispersed as small particles which are compatible with and uniformly distributed throughout the polyamide blend. Preferably the polyamide-compatible, oxidizable polydiene comprises an epoxy or anhydride functionality such that it is compatible with (and may react with) the carboxyl or amino end groups of the polyamides of the polyamide blend. The functionality in the polydiene component is also compatible with (and may also react) with amide group in the polyamide backbones of the polyamides of the polyamide blend. The functionality can be pendant to the backbone or at the chain ends of the polydiene. The preferred functional polydienes include functional polyalkadiene oligomers which can have the following general backbone structure:

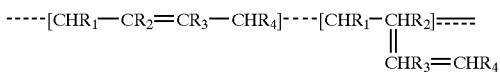

where $R_1$, $R_2$, $R_3$ and $R_4$ can be the same or different and can be selected from hydrogen (—H) or any of the lower alkyl groups (methyl, ethyl, propyl, butyl etc.). $R_2$ and $R_3$ may also be a chloro (—Cl) group. Illustrative of the backbone structure are polybutadiene (1,4 or 1,2 or mixtures of both), polyisoprene (1,4 or 3,4), poly 2,3-dimethyl butadiene, polychloroprene, poly 2,3-dichlorobutadiene, polyallene, poly,1,6-hexatriene, etc.

Specific non-limiting examples of functional, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene.

A preferred oxygen scavenger includes an anhydride functional polybutadiene oligomer. The oxygen scavenger is preferably present in the polyamide composition as a large number of small particles. The molecular weight of the functional polydiene oligomer preferably ranges from about 500 about to 8,000, preferably from about 1000 to about 6000 and most preferably from about 1500 to about 5500. It is preferably present in the overall composition in an amount of from about 0.1% to about 10% by weight, more preferably from about 1% to about 10% and most preferably from about 2% to about 6%. The functional, oxidizable polydiene is preferably present in the form of particles whose average particle size is in the range of from about 10 nm to about 1000 nm, and wherein the particles are substantially uniformly distributed throughout the polyamide blend. The polyamide composition may comprise either a blend of the polyamide blend and the polyamide-compatible oxidizable polydiene or a reaction product of the polyamide blend with the polyamide-compatible oxidizable polydiene.

The polyamide composition comprises at least one oxidation promoting metal salt catalyst such as a low molecular weight oxidation promoting metal salt catalyst. Suitable oxidation promoting metal salt catalysts comprise a counterion which is present in acetates, stearates, propionates, hexanoates, octanoates, benzoates, salicylates, and cinnamates and combinations thereof. Preferably the oxidation promoting metal salt catalyst comprises a cobalt, copper or ruthenium, acetate, stearate, propionate, hexanoate, octanoate, benzoate, salicylate or cinnamate, or combinations thereof. Preferred metal carboxylates include cobalt, ruthenium or copper carboxylate. Of these the more preferred is cobalt or copper carboxylate and the most preferred is cobalt carboxylate. It is preferably present in the overall composition in an amount of from about 0.001% to about 1% by weight, preferably from about 0.002% to about 0.5% and more preferably from about 0.005% to about 0.1%. The most preferred range is from about 0.01% to about 0.05%.

Preferably the polyamide composition further comprises a nanometer scale dispersed clay, known in the art as a nanoclay. Suitable clays are described in U.S. Pat. No. 5,747,560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium salt. A preferred clay comprises montmorillonite, hectorite or synthetic flouromica, more preferably montmorillonite or hectorite, and most preferably montmorillonite. A preferred organoammonium cation for treating the clay comprises N,N',N",N'''B is(hydroxyethyl), methyl, octadecyl ammonium cation or ω-carboxy alkylammonium cation, i.e., the ammonium cation derived such ω-aminoalkanoic acids as 6-aminocaproic acid, 11-aminoundecanoic acid, 12-aminododecanoic acid. Preferred fine dispersions of nanometer scale silicate platelets may be obtained via an in-situ polymerization of polyamide forming monomer(s) or via melt compounding of polyamide in the presence of the organoammonium salt treated clay. The clay preferably has an average platelet thickness ranging from about 1 nm to about 100 nm, and an average length and average width each ranging from about 50 nm to about 700 nm. It is preferably present in the overall polyamide composition in an amount of from about 0% to about 10% by weight, more preferably from about 0.5% to about 6% and most preferably from about 0.8% to about 4%.

The polyamide composition of the invention may optionally also include one or more conventional additives whose uses are well known to those skilled in the art. The use of such additives may be desirable in enhancing the processing of the composition as well as improving products or articles formed therefrom. Examples of such additives nonexclusively include oxidative and thermal stabilizers, lubricants, mold release agents, flame-retarding agents, oxidation inhibitors, dyes, pigments and other coloring agents, ultraviolet light stabilizers, nucleators, plasticizers, and the like, as well as other conventional additives known to the art. Such additives may be used in amounts of up to about 10% by weight of the overall polyamide composition.

Preferably the polyamide composition is produced via melt extrusion compounding of the polyamide blend with the other composition components. The composition may be formed by dry blending solid particles or pellets of each of the polyamide components and then melt blending these particles or pellets in a suitable mixing means such as an extruder, a roll mixer or the like. Typical melting temperatures range from about 230° C. to about 300° C., more preferably from about 235° C. to about 280° C. and most preferably from about 240° C. to about 260° C. for nylon 6 and its copolymers. Blending is preferably conducted for a period of time suitable to attain a substantially uniform blend. Such may easily be determined by those skilled in the art. If desired, the composition may be cooled and cut into pellets for further processing, may be extruded into a fiber, a filament, or a shaped element, or may be formed into films, such as oxygen barrier films, which may be optionally uniaxially or biaxially stretched or oriented by means well known in the art.

The polyamide composition of this invention may be used to produce various single layered or multilayered films, articles, bottles, containers, and the like using conventional processing techniques. Such films and articles may be produced using known extrusion and blown film techniques Bottles may be produced via extrusion or injection stretch blow molding, and containers may be produced via thermoforming techniques. Processing techniques for making films, sheets, containers and bottles are all well known in the art. For example, the components (i) and (ii) of the polyamide blend may be preblended and then the blend fed into an infeed hopper of an extruder, or each polyamide component (i) and (ii) may be fed into infeed hoppers of an extruder and then blended in the extruder. A melted and plasticated stream from the extruder is fed into a single manifold die and extruded into a layer. It then emerges from the die as a single layer film of nylon material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the resulting film is preferably substantially transparent.

Alternatively the composition may be formed into a film using a conventional blown film apparatus. The film forming apparatus may comprise "blown film" apparatus which includes a circular die head for bubble blown film through which a plasticized film composition is forced and formed into a film "bubble". The "bubble" is ultimately collapsed and formed into a film.

The composition may also be used to form a shaped article through any well known process, including extrusion blow molding and injection stretch-blow molding. An injection molding process softens the thermoplastic nylon blend in a heated cylinder, injecting it while molten under high pressure into a closed mold, cooling the mold to induce solidification, and ejecting the molded preform from the mold. Molding compositions are well suited for the production of preforms and subsequent reheat stretch-blow molding of these preforms into the final bottle shapes having the desired properties. The injection molded preform is heated to suitable orientation temperature, often in about the 90° C. to 120° C. range, and is then stretch-blow molded. The latter process consists of first stretching the hot preform in the axial direction by mechanical means such as by pushing with a core rod insert followed by blowing high pressure air (up to about 500 psi) to stretch in the hoop direction. In this manner, a biaxially oriented blown bottle is made. Typical blow-up ratios often range from about 5:1 to about 15:1. The glass transition temperature (Tg) of the polyamide composition of this invention, as determined by differential scanning calorimetry techniques, are preferably much less than about 120° C., which is generally the upper temperature limit for the neat PET's reheat stretch blow moldability into distortion-free bottles. In addition, in coinjection stretch blow molding processes for making multilayer bottles, extensive voiding with potential barrier loss might occur if the Tg of the polyamide composition exceeds about 110° C. The polyamide composition therefore preferably has a Tg of from about 20° C. to about 110° C., more preferably from about 40° C. to about 100° C. and most preferably from about 60° C. to about 90° C.

The polyamide composition of this invention may be formed as an integral layer in a multilayered film, bottle or container which includes one or more layers of another thermoplastic polymers such as polyesters; particularly polyethylene terephthalate (PET) and PET copolymers, polyolefins, ethylene vinyl alcohol copolymers, acrylonitrilecopolymers, acrylic polymers, vinyl polymers, polycarbonate, polystyrene, and the like. The polyamide composition of this invention is particularly suitable as a barrier layer in the construction and fabrication of multilayer bottles and thermoformed containers in which PET or polyolefin function as structural layers. Such PET/polyamide multilayer bottles can be made by coinjection stretch-blow molding process similar to the injection-stretch blow molding process as described above. Similarly, such multilayer bottles can be made by coextrusion blow molding. The latter process usually employs suitable optional tie layers for adhesion.

Useful polyesters for coinjection stretch blow molding process include polyethylene terephthalate (PET) and its copolymers in the intrinsic viscosity (I.V.) range of about 0.5 to about 1.2 dl/g, more preferably in the I.V. range of from about 0.6 to about 1.0 dl/g and most preferably in the I.V. range of from about 0.7 to about 0.9 dl/g. The polyolefins used in the coextrusion blow molding preferably comprise polymers of alpha-olefin monomers having from about 2 to about 6 carbon atoms, and includes homopolymers, copolymers (including graft copolymers), and terpolymers of alpha-olefins and the like. Examples of such homopolymers nonexclusively include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; polyhexene and the like. Such polyolefins may have a weight average molecular weight of from about 1,000 to about 1,000,000, and preferably of from about 10,000 to about 500,000. Preferred polyolefins include polyethylene, polypropylene, polybutylene and copolymers, and blends thereof. The most preferred polyolefins include polyethylene and polypropylene.

Suitable copolymers of ethylene and vinyl alcohol suitable for use in the present invention can be prepared by the methods disclosed in U.S. Pat. Nos. 3,510,464; 3,560,461; 3,847,845; and 3,585,177. Additional layers may also include adhesive tie layers to tie various layers together. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169.

The multilayered barrier articles of this invention can be formed by any conventional technique for forming films, including lamination, extrusion lamination, coinjection, stretch-blow molding and coextrusion blow molding and the like. A most preferred method for making multilayer film is by coextrusion. For example, materials for the individual layers, as well as any optional layers, are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Alternatively the individual layers may first be formed into sheets and then laminated together under heat and pressure with or without intermediate adhesive layers.

Optionally, at least one adhesive layer or "tie" layer, may be formed between each film layer. Suitable adhesive layers include adhesive polymers such as modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. Alternatively, one or more adhesive polymers may be directly blended or coextruded into other layers of the film, thus providing adhesion while minimizing the number of layers in the film.

Films produced according to the present invention may be oriented by stretching or drawing the films at draw ratios of from about 1.1:1 to about 10:1, and preferably at a draw ratio of from about 2:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

The film may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thickness of the film is preferably from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One noteworthy characteristic of articles produced from the composition of this invention is that they exhibit excellent gas barrier properties, particularly oxygen barrier properties. Oxygen permeation resistance or barrier may be measured using the procedure of ASTM D-3985. In general, the films of this invention have an oxygen transmission rate (OTR) of about less than 1 cc.mil/100in$^2$/day at 80% RH in air. The OTR (in cc.mil/100 in$^2$/day) preferably ranges from about 0.001 to about 2, more preferably from about 0.001 to about 0.5 and most preferably from about 0.001 to about 0.1.

The following non-limiting examples serve to illustrate the invention. It will be appreciated that variations in proportions and alternatives in elements of the components of the invention will be apparent to those skilled in the art and are within the scope of the present invention.

The following process and characterizations steps were conducted for the following examples and comparative examples.

Process 1 (Preparation of Catalyst Masterbatch)

This masterbatch is used as an additive in process 2 (preparation of oxygen scavenging resin). A Leistritz 18 mm co-rotating twin screw extruder equipped with a K-tron volumetric feeder was utilized in preparing the catalyst masterbatch. The screw used in this process was designed with three mixing zones and a venting zone. A blend of nylon 6 (Honeywell B73ZP) pellets and cobalt stearate pastilles (from Shepherd Chemical Co.) was fed into the throat of the extruder at a rate of ten (10) pounds per hour. The blend ratio was 95 weight percent PA-6 (Honeywell B73ZP) and five (5) weight percent cobalt stearate (Shepherd Chemical). After mixing in the extruder, the extrudate passed through a die plate and was quenched in a water bath and finally pelletized.

Process 2 (Preparation of Oxygen Scavenging Resin)

A Leistritz 18-mm co-rotating twin screw extruder equipped with a K-Tron volumetric feeder was utilized. Polybutadiene (either epoxy functionalized polybutadiene—Atofina Poly BD 600E or maleated polybutadiene—Sartomer 13 1MA5) was pumped with a Nichols-Zenith pump directly in the extruder (barrel 3) onto a set of forward conveying combing mixers. The polybutadiene was injected directly into the extruder with a Leistritz liquid injection nozzle. A blend of: (1) either (a) amorphous nylon (PA-6I/6T, EMS Grivory G21 or DuPont Selar PA 3426), (b) blend of PA-6 and amorphous nylon (PA-6I/6T, EMS Grivory G21 or DuPont Selar PA 3426) or (c) blend of PA-6 nanocomposite and amorphous nylon (PA-6I/6T, EMS Grivory G21 or DuPont Selar PA 3426) and (2) catalyst masterbatch was fed into the throat of the extruder at a rate of 10 pounds per hour. The blend consisted of approximately 98 weight percent of one of the components described in (1) above and two (2) weight percent catalyst masterbatch. The polybutadiene was pumped at a rate such that weight percentages of 1% to 6% polybutadiene were achieved. Extruder heating zones were set at approximately 260° C. The extruder was equipped with two downstream mixing zones (downstream of the combing mixers) consisting of kneading blocks, paddle and shearing elements. Subsequent to the final mixing zone and prior to the strand die the extruder was equipped with a vacuum venting zone. After passing through the strand die, the extrudate was quenched in a water bath and then pelletized.

Process 3 (Cast Film Processing)

A ThermoHaake 0.75 inch single screw extruder equipped with a Killion cast take-up roll system and a six-inch wide film die was flood fed with pellets from process two (2) or other source. Extruder barrel and die temperatures were set at approximately 260° C. Extrudate passed through the slit die onto a temperature controlled cast roll (set at ambient temperature). Film thickness was adjusted via cast roll speed and/or screw speed to prepare a film with a thickness of 0.001 inch to 0.003 inch.

Process 4 (Co-Injection Stretch Blow Molding)

A three or five layer co-injection stretch blow molding process was used to prepare multilayer beverage bottles with the following structures (inside layer to outside layer): (1) PET/oxygen scavenger/PET or (2) PET/oxygen scavenger/PET/oxygen scavenger/PET. The total oxygen scavenger content was approximately 5–10 weight percent of the total preform weight. Preforms were prepared with an Engel or Arburg co-injection press equipped with a co-injection head/manifold and multilayer preform mold. PET extruder temperature settings were approximately 280° C. Oxygen scavenging nylon compositions extruder barrel temperature settings were approximately 280° C. Finished bottles were prepared on Sidel stretch blow molding equipment set at temperatures up to approximately 110–114° C. In each case standard processing techniques were utilized.

Characterization

Oxygen Transmission Measurements: Oxygen transmission measurements were conducted on film samples with a Mocon Oxtran 2/20 apparatus equipped with SL sensors. Tests were conducted at 80% relative humidity in either air (21% oxygen) or pure oxygen (100% oxygen). Data were collected as a function of time and recorded in thickness normalized units: cc mil/100 $in^2$/atm day.

Optical Characterization: Barrier layer films that were extracted from bottles were evaluated for percent haze with a spectrometer. Thermal Characterization: Glass transition measurements were made using differential scanning calorimetry (DSC) on samples which were heated above their melting point and then quenched in liquid nitrogen. The quenched samples were characterized by DSC to measure the glass transition temperature (onset).

COMPARATIVE EXAMPLES 1–4

Comparative examples 1–4 are used as reference points for comparison with the examples described later.

Comparative Example 1 uses an amorphous nylon of the type PA(6I, 6T) available from either EMS (Grivory G21) or E. I. DuPont and Nemours Co. (Selar PA 3462).

Comparative Example 2 uses a blend of the amorphous nylon described in comparative one and nylon 6 (Honeywell B73ZP). The blend contains 70 weight percent amorphous nylon and 30 weight percent nylon 6.

Comparative Example 3 uses a nylon 6 nanocomposite (Honeywell XA-2908) containing 2 weight percent nanoclay (Nanocor Nanomer I24.T clay).

Comparative Example 4 uses a blend of the amorphous nylon described in comparative one and the nylon 6 nanocomposite described in comparative three. The blend contains 50 weight percent amorphous nylon and 50 weight percent nylon 6 nanocomposite.

The oxygen permeability (measured oxygen transmission rates) of these comparative examples is listed in Table 1.

EXAMPLES 1–4

Examples 1–4 illustrate the effect of the inventive nylon compositions.

Example 1 uses an oxygen scavenging amorphous nylon. The formulation comprises 94.5 weight percent amorphous nylon, 3 weight percent Atofina Poly BD600E and 2.5 weight percent catalyst masterbatch. This formulation was prepared via process steps one and two and later cast into film via process three and made into bottles (Process 4). The oxygen transmission rate of this oxygen scavenging amorphous nylon decreases rapidly to near zero and remains near zero for approximately 25 days. Relative to Comparative Example 1 there is a 50 fold reduction in oxygen transmission rate.

Example 2 is an oxygen scavenging amorphous nylon/nylon 6 blend. The blend comprises 66 weight percent amorphous nylon (EMS Grivory G21), 28.5 weight percent nylon 6 (Honeywell B73ZP), 3 weight percent Atofina Poly BD600E and 2.5 weight percent catalyst masterbatch. This formulation was prepared via process steps one and two and later cast into film via Process 3 and made into bottles (Process 4). The oxygen transmission rate of this oxygen scavenging blend decreases to near zero (0.015 cc mil/100 in$^2$/atm day) and remains very low for approximately 13 days. Relative to Comparative Example 2 there is a 25 fold reduction in oxygen transmission rate.

Example 3 uses an oxygen scavenging amorphous nylon/nylon 6 blend. The blend comprises 66 weight percent amorphous nylon (EMS Grivory G21), 28.5 weight percent nylon 6 (Honeywell B73ZP), 3 weight percent Ricon 131 MA-5 and 2.5 weight percent catalyst masterbatch. This formulation was prepared via Processes 1 and 2 and later cast into film via Process 3 and made into bottles (Process 4). The oxygen transmission rate of this oxygen scavenging blend decreases to near zero (0.003 cc mil/100 in$^2$/atm day) and remains very low for approximately 45 days. Relative to Comparative Example 2 there is a 100 fold reduction in oxygen transmission rate.

Example 4 uses an oxygen scavenging amorphous nylon/nylon 6 nanocomposite blend. The blend comprises 47.25 weight percent amorphous nylon (EMS Grivory G21), 478.25 weight percent nylon 6 nanocomposite (Honeywell XA-2908), 3 weight percent Ricon 131 MA-5 and 2.5 weight percent catalyst masterbatch. This formulation was prepared via Processes 1 and 2 and later cast into film via Process 3. The oxygen transmission rate of this oxygen scavenging blend decreases to near zero (0.004 cc mil/100 in$^2$/atm day) and remains very low for approximately 35 days. Relative to Comparative Example 4 there is an 80 fold reduction in oxygen transmission rate.

The oxygen permeability (measured oxygen transmission rates) of films made from these Comparative Examples is listed in Table 1. The oxygen permeability (measured as parts per million oxygen ingress into three layer bottles prepared with either Example 3 or Example 4 as the barrier (middle) layer of the 3 layer bottles is given in Table 2.

The percent haze in barrier layer films extracted from 3 layer bottles which include Comparative Example 1, and Examples 1, 3–4 are given in Table 1.

The glass transition temperature as measured by DSC of Comparative Example 1 and Examples 2–4 is given in Table 1.

Discussion

Examples 1–4 each exhibit oxygen scavenging and yield substantially lower oxygen transmission rates (as measured on thin films) when compared with the comparative examples (i.e. non-oxygen scavenging examples).

The high haze level in Comparative Example 1 and Example 1 indicate the inherent difficulty in processing amorphous nylon and oxygen scavenging amorphous nylon into clear (low haze) multilayer bottles. The high haze levels in bottles containing layers of Comparative Example 1 or Example 1 are due to crazing (microcavitation) in the amorphous nylon layers which occurs during the stretch blow molding process. The upper limit for stretch blow molding processes involving PET (such as multilayer beverage bottles) is approximately 120° C. Above this temperature an effect know as "pearl" is observed in the finished bottles. Pearl is a hazy white appearance in the PET caused by crystallization in the PET layers. This crystallization is likely to occur at high stretch blow molding temperatures, effectively placing an upper temperature limit on PET stretch blow molding. Unfortunately, amorphous nylon has a glass transition temperature as listed in Table 1 of approximately 125° C. Since this temperature is above the injection stretch blow molding temperature, amorphous nylon is unable to stretch without defects forming. Consequently, amorphous nylon develops crazes which result in a high bottle haze level. The crazes and microcracks developed in the pure amorphous nylon layer can be readily observed by optical microscopy.

Examples 2–4 of this invention utilize a blend approach to avoid the craze/haze formation observed in amorphous nylon containing multilayer bottles. These novel blends result in lower glass transition temperature (shown for Example 2 in Table 1) and consequently significantly lower haze in multilayer bottles (see Table 1). The combination of oxygen scavenger and blending results in formulations which have low oxygen permeability and excellent co-injection stretch blow molding processability. The nylon layer in the multilayer PET bottle was quite clear and free from any crazes or microdefects as observed under optical microscopy.

TABLE 1

| Ex. No. | Process Steps | Wt. % PBD | Wt. % PA (6I, 6T) | Wt. % PA-6 | Wt. % PA-6 Nano | Wt. % Catalyst MB | OTR* Day 1 | OTR Day 5 | OTR Day 10 | OTR Day 20 | OTR Day 30 | Tg/ °C. | Tcc††/ °C. | Haze/ % |
|---|---|---|---|---|---|---|---|---|---|---|---|---|---|---|
| Comp. 1 | 3, 4 | 0 | 100 | 0 | 0 | 0 | 0.2 | 0.2 | 0.2 | 0.2 | 0.2 | 122 | | 7.7 |
| Comp. 2 | 3, 4 | 0 | 70 | 30 | 0 | 0 | 0.4 | 0.3 | 0.3 | 0.3 | 0.3 | | | |
| Comp. 3 | 3 | 0 | 0 | 0 | 100 | 0 | 0.6 | 0.6 | 0.6 | 0.6 | 0.6 | | | |
| Comp. | 3 | 0 | 50 | 0 | 50 | 0 | 0.24 | 0.24 | 0.24 | 0.24 | 0.24 | | | |

TABLE 1-continued

| Ex. No. | Process Steps | Wt. % PBD | Wt. % PA (6I, 6T) | Wt. % PA-6 | Wt. % PA-6 Nano | Wt. % Catalyst MB | OTR* Day 1 | OTR Day 5 | OTR Day 10 | OTR Day 20 | OTR Day 30 | Tg/ °C. | Tcc††/ °C. | Haze/ % |
|---|---|---|---|---|---|---|---|---|---|---|---|---|---|---|
| 1 | 1, 2, 3, 4 | 3† | 94.5 | 0 | 0 | 2.5 | 0.003 | 0.005 | 0.008 | 0.009 | 0.01 | | | 81 |
| 2 | 1, 2, 3 | 3† | 66 | 28.5 | 0 | 2.5 | 0.3 | 0.012 | 0.015 | N/A | N/A | 85 | | |
| 3 | 1, 2, 3, 4 | 3‡ | 66 | 28.5 | 0 | 2.5 | 0.6 | 0.6 | 0.6 | 0.003 | 0.003 | 91 | No Detect | 0.7 |
| 4 | 1, 2, 3 | 3‡ | 47.25 | 0 | 47.25 | 2.5 | 0.009 | 0.002 | 0.003 | 0.003 | 0.004 | 75 | 121 | 2.15 |

†Atofina Poly BD600E
‡Sartomer 131MA5
* Oxygen Transmission rate in air (cc mil/100 in2/atm day). To convert to pure oxygen multiply oxygen transmission rate by five and divide number of days by five.
††Measured in DSC at cooling rate of 80° C./min.

TABLE 2

| Example | Description | Volume/oz | Conditions | Oxygen Ingress after 120 days/ ppm† |
|---|---|---|---|---|
| 3 | 3 layer beer with champagne base | 12 | 100% RH in, 50% RH out | 3 |
| 4 | 3 layer beer with champagne base | 12 | 100% RH in, 50% RH out | 0.3 |

†Measured on Mocon Oxtran 2/20

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayer article which comprises:
   a) a polyamide composition layer comprising a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst; and
   b) a thermoplastic polymer layer on one or both sides of said polyamide composition layer.

2. The multilayer article of claim 1 wherein said thermoplastic polymer layer comprises a polyolefin or polyester.

3. The multilayer article of claim 1 wherein said thermoplastic polymer layer comprises a polyethylene terephthalate.

4. The multilayer article of claim 3 wherein said polyamide blend comprises a blend of nylon 6I/6T and nylon 6.

5. The multilayer article of claim 4 wherein said polydiene is polybutadiene.

6. The multilayer article of claim 5 wherein said oxidation promoting metal salt catalyst comprises a cobalt carboxylate salt.

7. The multilayer article of claim 6 which is in the form of a bottle or container.

8. The multilayer article of claim 1 wherein said thermoplastic polymer layer and polyamide composition layer are attached to one another by coextrusion, lamination or coinjection.

9. A process for producing a multilayer article which comprises:
   a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;
   b) separately melting a thermoplastic polymer composition;
   c) coextruding, casting, blowing, thermoforming, blow molding or coinjecting the mixture and thermoplastic polymer composition into a multilayer article; and
   d) cooling the article.

10. The process of claim 9 wherein said article is in the form of a film, a bottle or a container.

11. The process of claim 9 wherein said article is a film which is subsequently oriented.

12. The process of claim 9 wherein said polyamide is melted prior to blending with said oxidizable polydiene.

13. The process of claim 9 wherein said polyamide and said oxidizable polydiene are melted after blending.

14. A process for producing a multilayer article which comprises:
   a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;
   b) separately melting a thermoplastic polymer composition;
   c) coinjecting molding the mixture and thermoplastic polymer composition into a multilayer preform;
   d) reheating the perform; and
   e) blow molding the perform into a multilayer article.

15. A multilayer article formed by a process comprising:
   a) melting a slow crystallizing polyamide blend comprising (i) an amorphous, semiaromatic polyamide homopolymer, copolymer or mixture thereof and (ii) a semicrystalline, aliphatic polyamide homopolymer, copolymer or mixture thereof wherein in the weight ratio of (i):(ii) ranges from about 99:1 to about 30:70; at least one polyamide-compatible, oxidizable polydiene; and at least one oxidation promoting metal salt catalyst to thereby form a mixture;

b) separately melting a thermoplastic polymer composition;

c) coinjecting molding the mixture and thermoplastic polymer composition into a multilayer preform;

d) reheating the perform; and e) blow molding the perform into a multilayer article.

16. An oxygen barrier film comprising a layer of a polyamide composition which comprises:

a) a slow crystallizing polyamide blend comprising (i) an amorphous, semi aromatic polyamide homopolymer, copolymer or mixture thereof and (ii) a semi crystalline, aliphatic polyamide homopolymer, copolymer or mixture thereof wherein in the weight ratio of (i):(ii) ranges from about 99:1 to about 30:70;

b) at least one polyamide-compatible, oxidizable polydiene; and c) at least one oxidation promoting metal salt catalyst and comprising a thermoplastic polymer layer on one or both sides of the polyamide composition layer.

17. A shaped article which comprises a polyamide composition comprising:

a) a slow crystallizing polyamide blend comprising (i) an amorphous, semi aromatic polyamide homopolymer, copolymer or mixture thereof and (ii) a semi crystalline, aliphatic polyamide homopolymer, copolymer or mixture thereof wherein in the weight ratio of (i):(ii) ranges from about 99:1 to about 30:70;

b) at least one polyamide-compatible, oxidizable polydiene; and c) at least one oxidation promoting metal salt catalyst, wherein said shaped article is in the form of a bottle or container.

18. The shaped article of claim 17 further comprising at least one layer of polyethylene terephthalate.

* * * * *

UNITED STATES PATENT AND TRADEMARK OFFICE
CERTIFICATE OF CORRECTION

PATENT NO.    : 6,410,156 B1
DATED         : June 25, 2002
INVENTOR(S)   : Murali K. Akkapeddi et al.

It is certified that error appears in the above-identified patent and that said Letters Patent is hereby corrected as shown below:

<u>Column 20,</u>
Line 22, insert the following claims:

19. The article of claim 1 wherein said polyamide-compatible, oxidizable polydiene comprises an epoxy or anhydride functional polybutadiene.

20. The article of claim 1 wherein said polyamide-compatible, oxidizable polydiene is in the form of particles which are substantially uniformly distributed in the polyamide blend.

21. The article of claim 1 wherein said polyamide-compatible, oxidizable polydiene is in the form of particles whose average particle size is in the range of from about 10 nm to about 1000 nm, and which particles are substantially uniformly distributed in the polyamide blend.

22. The article of claim 1 wherein said oxidation promoting metal salt catalyst comprises a carboxylate.

23. The article of claim 1 wherein said oxidation promoting metal salt catalyst is selected from the group consisting of metal acetates, stearates, propionates, hexanoates, octanoates, benzoates, salicylates, cinnamates, or combinations thereof.

24. The article of claim 1 wherein said oxidation promoting metal salt catalyst is selected from the group consisting of a cobalt, copper or ruthenium, acetate, stearate, propionate, hexanoate, octanoate, benzoate, salicylate, cinnamate, or combinations thereof.

25. The article of claim 1 wherein said semicrystalline, aliphatic polyamide is selected from the group consisting of polyamides 6; 6,6; 7; 10; 11; 12; 6,10; 6,9; 4,6; 6,6/6; and 6/6,6, and mixtures thereof.

26. The article of claim 1 wherein said amorphous, semiaromatic polyamide is selected from the group consisting of polyamides 6I; 6I/6T; 6/6I; MXDI; 6/MXDI, and mixtures thereof.

27. The article of claim 1 wherein said semicrystalline, aliphatic polyamide comprises nylon 6.

28. The article of claim 27 wherein said at least one polyamide-compatible, oxidizable polydiene comprises polybutadiene.

29. The article of claim 28 wherein said polybutadiene is a functionalized oligomer.

30. The article of claim 27 wherein said amorphous, semiaromatic polyamide comprises poly(hexamethylene isophthalamide-co-terephthalamide).

31. The article of claim 1 wherein said weight ratio of (i):(ii) ranges from about 80:20 to about 35:65.

UNITED STATES PATENT AND TRADEMARK OFFICE
CERTIFICATE OF CORRECTION

PATENT NO. : 6,410,156 B1
DATED : June 25, 2002
INVENTOR(S) : Murali K. Akkapeddi et al.

It is certified that error appears in the above-identified patent and that said Letters Patent is hereby corrected as shown below:

Column 20 (cont'd),

32. The article of claim 1 wherein said semicrystalline, aliphatic polyamide comprises nylon 6,6.

33. The article of claim 1 wherein said polyamide blend exhibits either no Tcc or a Tcc of about 150°C or less upon cooling from the melt at a cooling rate of 20°C/min. as determined by differential scanning calorimetry.

34. The article of claim 17 wherein said polyamide-compatible, oxidizable polydiene comprises a polybutadiene.

35. The article of claim 17 wherein said polyamide-compatible, oxidizable polydiene comprises an epoxy or anhydride functional polybutadiene.

36. The article of claim 17 wherein said polyamide-compatible, oxidizable polydiene is in the form of particles which are substantially uniformly distributed in the polyamide blend.

37. The article of claim 17 wherein said polyamide-compatible, oxidizable polydiene is in the form of particles whose average particle size is in the range of from about 10 nm to about 1000 nm, and which particles are substantially uniformly distributed in the polyamide blend.

38. The article of claim 17 wherein said oxidation promoting metal salt catalyst comprises a carboxylate.

39. The article of claim 17 wherein said oxidation promoting metal salt catalyst is selected from the group consisting of metal acetates, stearates, propionates, hexanoates, octanoates, benzoates, salicylates, cinnamates, or combinations thereof.

40. The article of claim 17 wherein said oxidation promoting metal salt catalyst is selected from the group consisting of a cobalt, copper or ruthenium, acetate, stearate, propionate, hexanoate, octanoate, benzoate, salicylate, cinnamate, or combinations thereof.

41. The article of claim 17 wherein said semicrystalline, aliphatic polyamide is selected from the group consisting of polyamides 6; 6,6; 7; 10; 11; 12; 6,10; 6,9; 4,6; 6,6/6; and 6/6,6, and mixtures thereof.

42. The article of claim 17 wherein said amorphous, semiaromatic polyamide is selected from the group consisting of polyamides 6I; 6I/6T; 6/6I; MXDI; 6/MXDI, and mixtures thereof.

43. The article of claim 17 wherein said semicrystalline, aliphatic polyamide comprises nylon 6.

UNITED STATES PATENT AND TRADEMARK OFFICE
CERTIFICATE OF CORRECTION

PATENT NO.     : 6,410,156 B1
DATED          : June 25, 2002
INVENTOR(S)    : Murali K. Akkapeddi et al.

It is certified that error appears in the above-identified patent and that said Letters Patent is hereby corrected as shown below:

Column 20 (cont'd),

44. The article of claim 43 wherein said at least one polyamide-compatible, oxidizable polydiene comprises polybutadiene.

45. The article of claim 17 wherein said at least one polyamide-compatible polydiene comprises a functionalized polybutadiene oligomer.

46. The article of claim 43 wherein said amorphous, semiaromatic polyamide comprises poly(hexamethylene isophthalamide-co-terephthalamide).

47. The article of claim 17 wherein said weight ratio of (i):(ii) ranges from about 80:20 to about 35:65.

48. The article of claim 17 wherein said semicrystalline, aliphatic polyamide comprises nylon 6,6.

49. The article of claim 17 wherein said polyamide blend exhibits either no Tcc or a Tcc of about 150°C or less upon cooling from the melt at a cooling rate of 20°C/min. as determined by differential scanning calorimetry.

50. The article of claim 17 wherein said polyamide blend comprises a blend of nylon 6I/6T and nylon 6.

51. The article of claim 17 wherein said oxidation promoting metal salt catalyst comprises a cobalt carboxylate salt.

Signed and Sealed this

Sixteenth Day of November, 2004

JON W. DUDAS
*Director of the United States Patent and Trademark Office*